US012023698B2

(12) United States Patent
Hong et al.

(10) Patent No.: US 12,023,698 B2
(45) Date of Patent: Jul. 2, 2024

(54) DISPENSING APPARATUS HAVING NOZZLE CLEANING FUNCTION

(71) Applicant: PROTEC CO., LTD., Gyeonggi-do (KR)

(72) Inventors: Seung Min Hong, Seoul (KR); Dae Yong Lee, Gyeonggi-do (KR)

(73) Assignee: PROTEC CO., LTD., Gyeonggi-do (KR)

( * ) Notice: Subject to any disclaimer, the term of this patent is extended or adjusted under 35 U.S.C. 154(b) by 371 days.

(21) Appl. No.: 17/388,037

(22) Filed: Jul. 29, 2021

(65) Prior Publication Data

US 2022/0032332 A1 Feb. 3, 2022

(30) Foreign Application Priority Data

Jul. 30, 2020 (KR) ........................ 10-2020-0094946

(51) Int. Cl.

| | |
|---|---|
| ***B05B 15/55*** | (2018.01) |
| ***B05C 11/10*** | (2006.01) |
| ***B05D 1/18*** | (2006.01) |
| ***B08B 3/04*** | (2006.01) |
| ***B08B 13/00*** | (2006.01) |

(52) U.S. Cl.

CPC .......... *B05B 15/55* (2018.02); *B05C 11/1007* (2013.01); *B05C 11/1039* (2013.01); *B05D 1/18* (2013.01); *B08B 3/04* (2013.01); *B08B 13/00* (2013.01)

(58) Field of Classification Search

CPC ..................................................... B05B 15/55

See application file for complete search history.

(56) References Cited

U.S. PATENT DOCUMENTS

| | | | |
|---|---|---|---|
| 7,944,363 | B2 | 5/2011 | Kim et al. |
| 7,955,417 | B2 | 6/2011 | Ichihara et al. |
| 8,288,710 | B2 | 10/2012 | Tsukamoto et al. |
| 10,384,229 | B2 | 8/2019 | Hong |
| 2008/0264252 | A1 | 10/2008 | Ichihara et al. |
| 2010/0019134 | A1 | 1/2010 | Tsukamoto et al. |
| 2011/0074870 | A1 | 3/2011 | Maida |

FOREIGN PATENT DOCUMENTS

| | | |
|---|---|---|
| JP | H0620936 | 1/1994 |
| JP | 2000231838 | 8/2000 |
| JP | 2001038272 | 2/2001 |
| JP | 2013247276 | 12/2013 |
| JP | 2015107478 | 6/2015 |
| JP | 2016064381 | 4/2016 |
| KR | 100708314 | 4/2007 |
| KR | 20150067663 | 6/2015 |
| KR | 101884983 | 8/2018 |

*Primary Examiner* — Jason Y Ko

(74) *Attorney, Agent, or Firm* — JCIPRNET

(57) ABSTRACT

Provided is a dispensing apparatus capable of cleaning a nozzle, and more particularly, to a dispensing apparatus capable of cleaning a nozzle having the function of cleaning a nozzle of an apparatus for dispensing a viscous solution with a cleaning solution. The dispensing apparatus capable of cleaning a nozzle can effectively supply and manage a cleaning solution while effectively cleaning the viscous solution that are likely to be attached to the nozzle.

13 Claims, 5 Drawing Sheets

DISPENSING APPARATUS HAVING NOZZLE CLEANING FUNCTION

CROSS-REFERENCE TO RELATED APPLICATION

This application is based on and claims priority under 35 U.S.C. § 119 to Korean Patent Application No. 10-2020-0094946, filed on Jul. 30, 2020, in the Korean Intellectual Property Office, the disclosure of which is incorporated by reference herein in its entirety.

BACKGROUND

1. Field

One or more embodiments relate to a dispensing apparatus capable of cleaning a nozzle, and more particularly, to a dispensing apparatus capable of cleaning a nozzle having a function of cleaning a nozzle of an apparatus for dispensing a viscous solution with a cleaning solution.

2. Description of the Related Art

A process of dispensing a viscous solution is widely used in a semiconductor process or a process of manufacturing a semiconductor component.

The viscous solution used in the dispensing process has various types. When the viscous solution is dispensed, the viscous solution is often hardened at an end portion of a nozzle, which affects the quality of the dispensing process.

In particular, in a case in which an adhesive solution having a very fast curing rate is dispensed as the viscous solution, a probability that the adhesive solution is attached to a lower or side surface of the nozzle and cured during an adhesive solution application process is increased.

As described above, when the adhesive solution is attached to the nozzle and cured, a problem occurs in that the quality of the adhesive solution application process is degraded. In order to prevent the occurrence of such a problem, an apparatus for effectively cleaning and wiping the adhesive solution attached to the nozzle is required.

SUMMARY

One or more embodiments include a dispensing apparatus capable of cleaning a nozzle, allowing a cleaning solution to be easily managed while effectively cleaning the nozzle.

Additional aspects will be set forth in part in the description which follows and, in part, will be apparent from the description, or may be learned by practice of the presented embodiments of the disclosure.

According to one or more embodiments, a dispensing apparatus capable of cleaning a nozzle, which is configured to apply a viscous solution of a liquid resin material, includes: a dispensing pump configured to dispense the viscous solution through a nozzle; a pump moving unit configured to move the dispensing pump; a cleaning unit including a dipping part configured to eject the cleaning solution so that the nozzle of the dispensing pump moved by the pump moving unit is immersed in the cleaning solution, a dipping storage part configured to receive and accommodate the cleaning solution that is ejected from the dipping part and flows thereinto, a storage tank in which the cleaning solution to be supplied to the dipping part is stored, a supply fluid channel connecting the storage tank and the dipping part to each other, a supply pump provided in the supply fluid channel to supply the cleaning solution stored in the storage tank to the dipping part, and a collection fluid channel connecting the dipping storage part and the storage tank to transfer the cleaning solution accommodated in the dipping storage part to the storage tank; and a control unit configured to control operations of the dispensing pump, the pump moving unit, and the cleaning unit.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
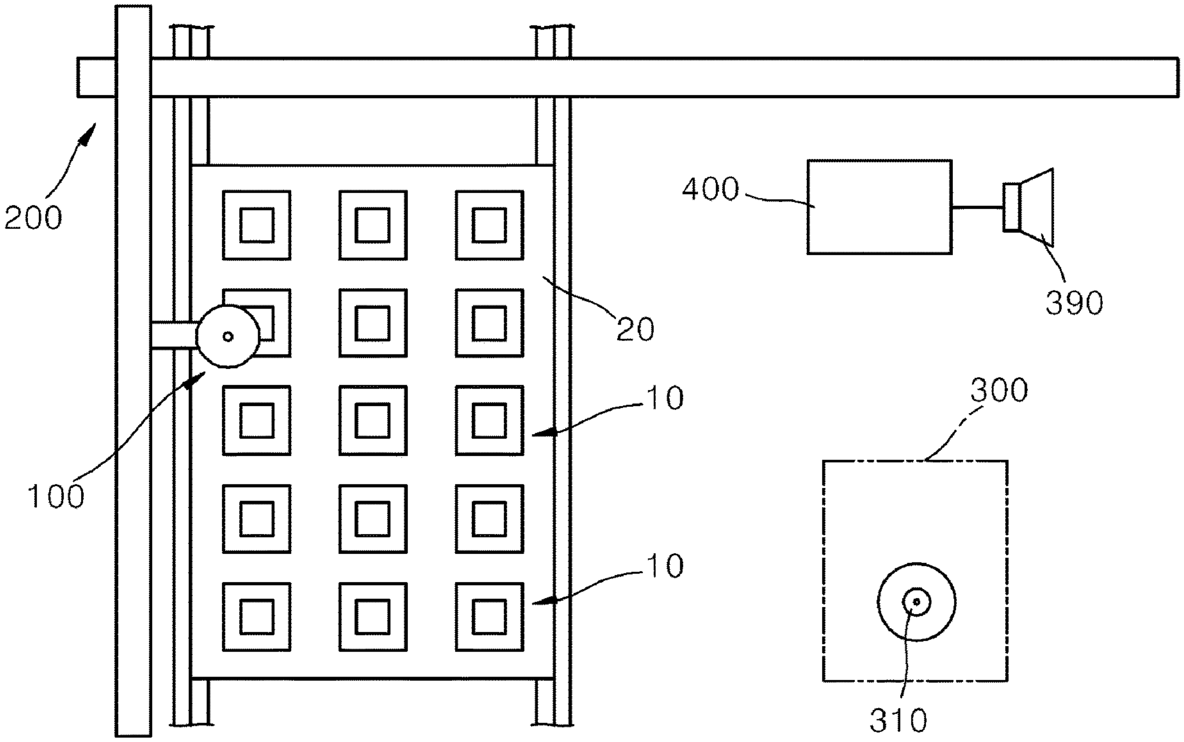
FIG. 1 is a plan view of a dispensing apparatus capable of cleaning a nozzle according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a dispensing apparatus capable of cleaning a nozzle according to the present disclosure will be described in detail with reference to the drawings.

Figure 2:
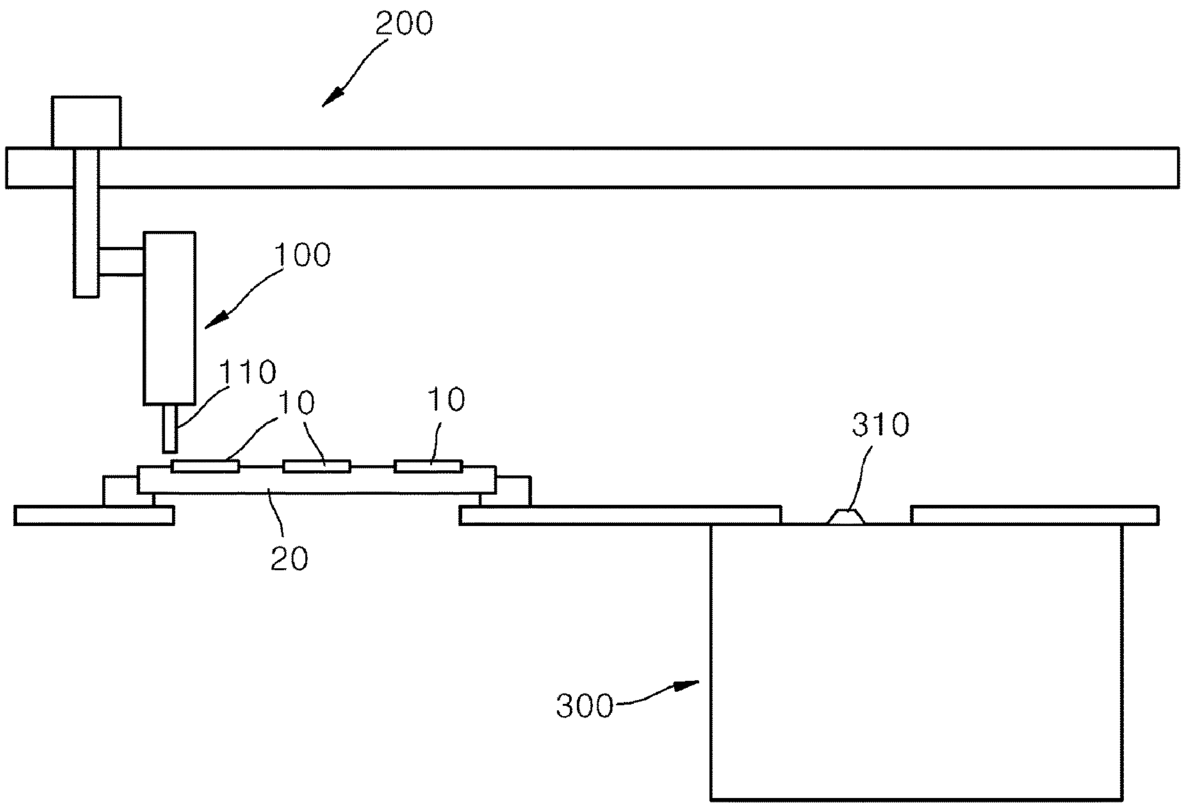
FIG. 2 is a front view of the dispensing apparatus capable of cleaning a nozzle shown in FIG. 1.

FIG. 1 is a plan view of a dispensing apparatus capable of cleaning a nozzle according to an embodiment of the present disclosure, and FIG. 2 is a front view of the dispensing apparatus capable of cleaning a nozzle shown in FIG. 1.

Referring to FIGS. 1 and 2, the dispensing apparatus capable of cleaning a nozzle according to the present embodiment includes a dispensing pump 100, a pump moving unit 200, and a cleaning unit 300.

The dispensing pump 100 includes a nozzle 110. The dispensing pump 100 applies a viscous solution made of a liquid resin material, such as an adhesive, through the nozzle 110. The viscous solution is applied to a semiconductor component, an electronic device, a package, or the like through the dispensing pump 100.

A pump of various known structures may be used as the dispensing pump 100 for applying a viscous solution.

The pump moving unit 200 is configured to move the dispensing pump 100. The pump moving unit 200 of the present embodiment moves the dispensing pump 100 in horizontal and vertical directions. A plurality of materials 10, which are mounted on a tray 20, are arranged below the dispensing pump 100. The pump moving unit 200 sequentially moves the dispensing pump 100 to sequentially apply the viscous solution to each of the materials 10. The pump moving unit 200 may be configured in various manners as necessary using a known component such as a linear motor.

The cleaning unit 300 is for cleaning the nozzle 110 of the dispensing pump 100 or preventing the viscous solution at an end portion of the nozzle 110 from being cured. The viscous solution attached to or stuck on the end portion of the nozzle 110 may be cured by being in contact with air or moisture in the air. The cleaning unit 300 uses a cleaning solution to prevent such a phenomenon from occurring.

When the cleaning unit 300 generates a flow of the cleaning solution such as ethanol, the pump moving unit 200 moves the dispensing pump 100 and immerses the nozzle 110 in the flowing cleaning solution to clean the nozzle 110 or prevent the viscous solution from curing. After a predetermined time interval or a predetermined number of dispensing operations, the pump moving unit 200 moves the dispensing pump 100 to the cleaning unit 300 to clean the nozzle 110.

Figure 3:
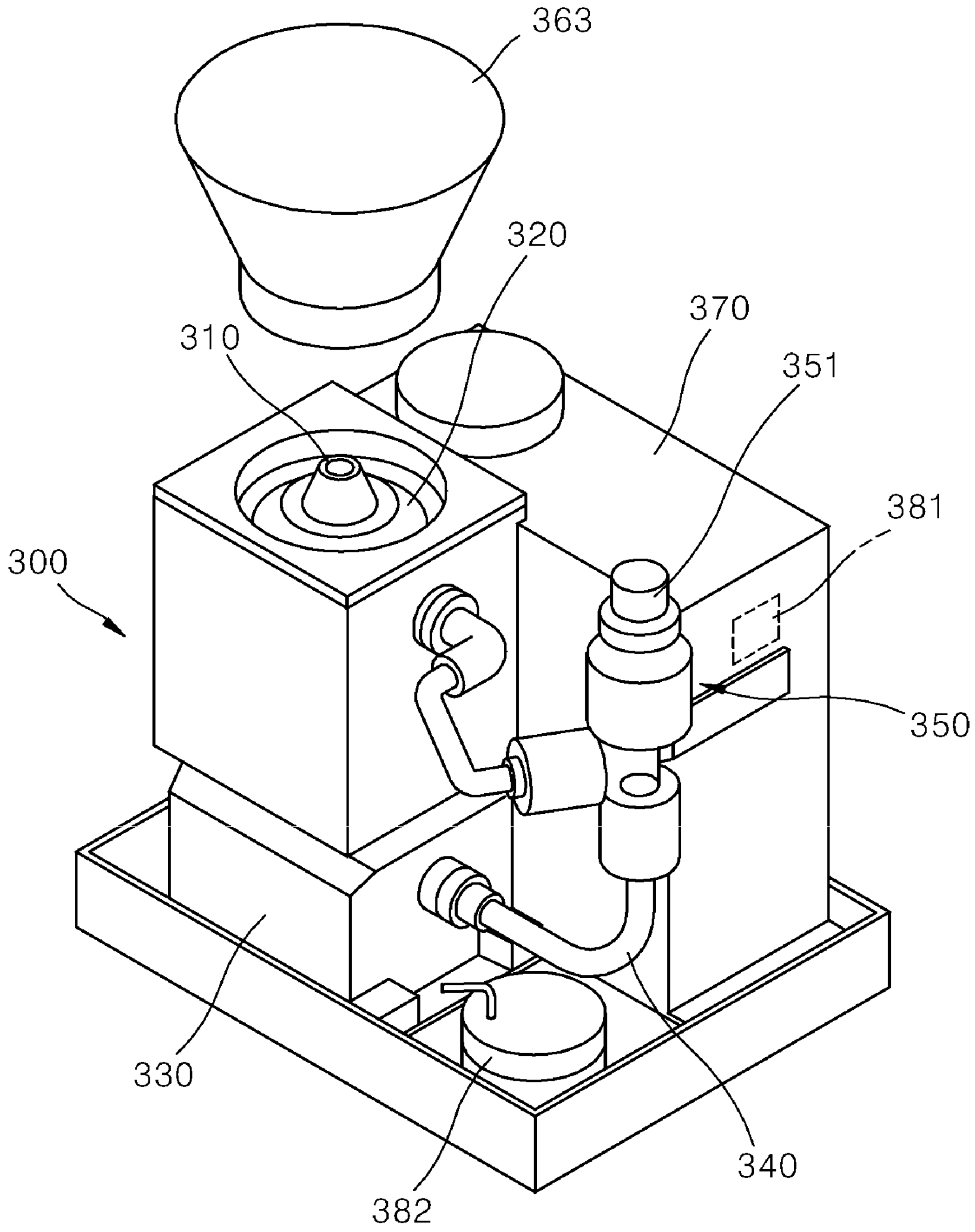
FIG. 3 is a perspective view of a cleaning unit of the dispensing apparatus capable of cleaning a nozzle shown in FIG. 1.
Figure 4:
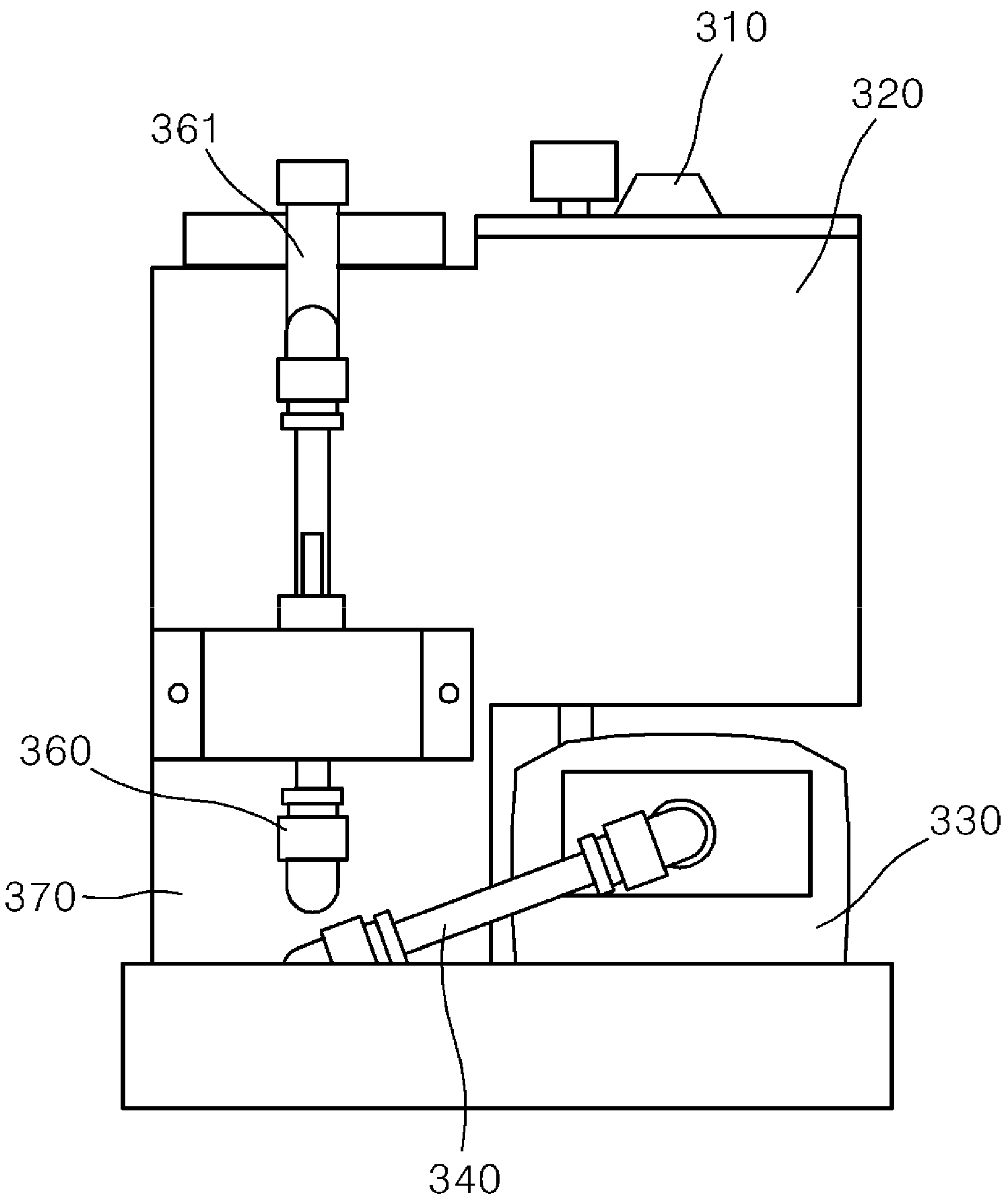
FIG. 4 is a left side view of the cleaning unit shown in FIG. 3.
Figure 5:
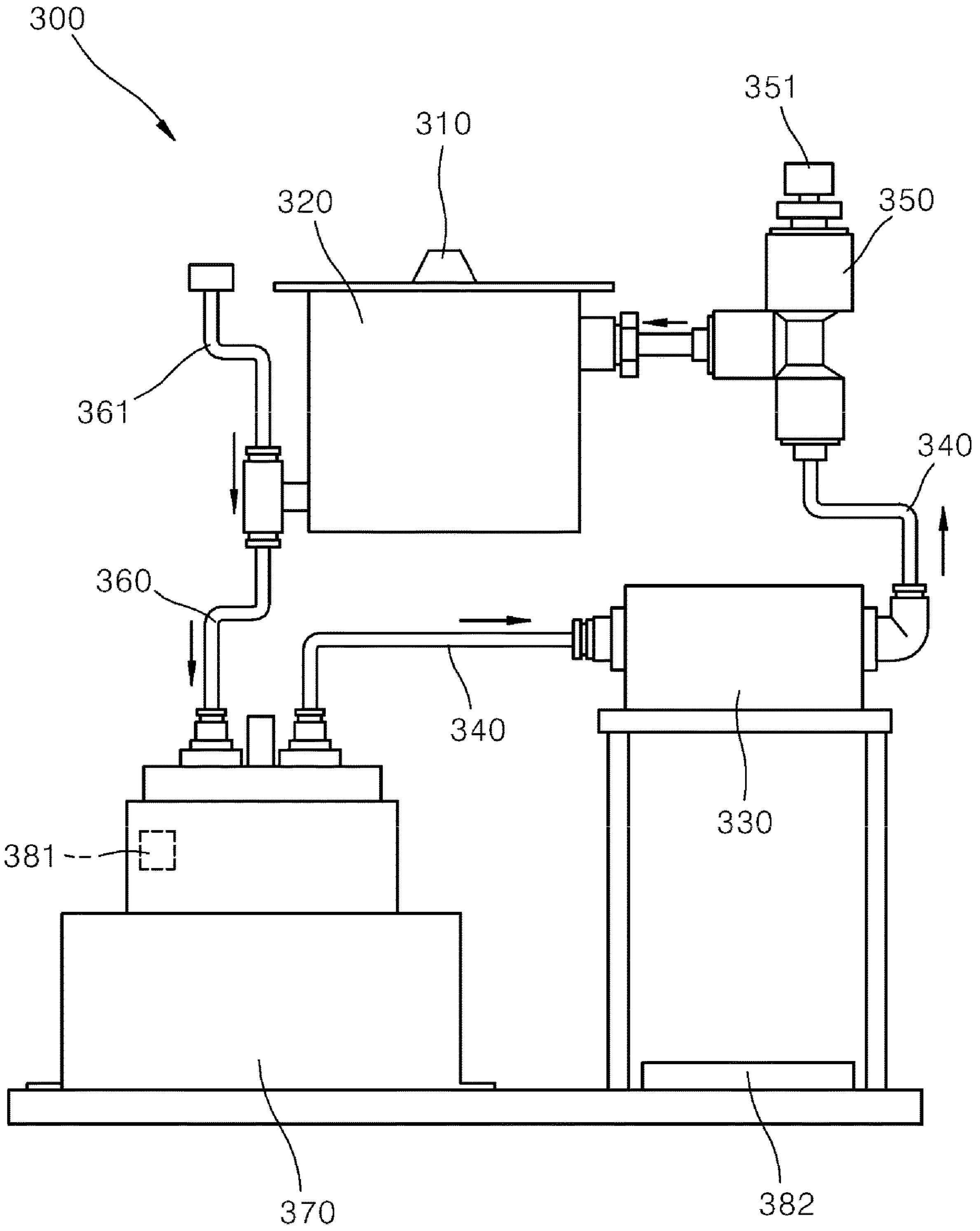
FIG. 5 is a schematic view for describing an operation of the cleaning unit shown in FIG. 3.

Referring to FIGS. 3 to 5, in the dispensing apparatus capable of cleaning a nozzle according to the present embodiment, the cleaning unit 300 includes a dipping part 310, a dipping storage part 320, a storage tank 370, and a supply pump 330.

The cleaning solution is stored in the storage tank 370. The cleaning solution stored in the storage tank 370 is supplied to the dipping part 310. A supply fluid channel 340 connects the storage tank 370 and the dipping part 310. The supply pump 330 is provided in the supply fluid channel 340. The supply pump 330 supplies the cleaning solution stored in the storage tank 370 to the dipping part 310 through the supply fluid channel 340 to allow the cleaning solution to be ejected through the dipping part 310. In the case of the present embodiment, a pump in the form of a membrane pump is used as the supply pump 330.

The dipping part 310 is formed such that the cleaning solution supplied through the supply fluid channel 340 is ejected and flows therethrough. The nozzle 110 of the dispensing pump 100 is cleaned while being disposed in the dipping part 310 so as to be immersed in the flowing cleaning solution. In the case of the present embodiment, the dipping part 310 is formed to eject the cleaning solution upward.

As shown in FIG. 3, the dipping storage part 320 is formed in a container shape surrounding an outer side of the dipping part 310. The cleaning solution, which was ejected from the dipping part 310 and has cleaned the nozzle 110, flows downward and is collected in the dipping storage part 320. The dipping storage part 320 is disposed above the storage tank 370.

A collection fluid channel 360 connects the dipping storage part 320 and the storage tank 370 to each other. The cleaning solution stored in the dipping storage part 320 flows to the storage tank 370 disposed below the dipping storage part 320 through the collection fluid channel 360. Due to this structure, the cleaning solution circulates through the supply fluid channel 340 and the collection fluid channel 360. That is, the cleaning solution, which is supplied from the storage tank 370 to the dipping part 310 through the supply fluid channel 340, flows to the dipping storage part 320 and is transferred back to the storage tank 370 through the collection fluid channel 360, thereby being circulated by the supply pump 330.

A flow rate control valve 350 is provided in the supply fluid channel 340 between the supply pump 330 and the dipping part 310. The flow rate control valve 350 is configured to manually control a flow rate of the cleaning solution supplied to the dipping part 310. In the case of the present embodiment, as shown in FIG. 3, the flow rate control valve 350 is formed to control a fluid channel size of the supply fluid channel 340 by manually operating a control part 351 in the form of a bolt. That is, the flow rate control valve 350 is operated in such a manner in which the flow rate is decreased when the control part 351 is tightened and the flow rate is increased when the control part 351 is loosened.

The cleaning unit 300 further includes a replenishment fluid channel 361. In the case of the present embodiment, as shown in FIG. 5, the replenishment fluid channel 361 is formed to be connected to the collection fluid channel 360. The replenishment fluid channel 361 is normally covered with a stopper and blocked. When it is necessary to replenish the cleaning solution into the storage tank 370, the stopper is opened and the cleaning solution is additionally supplied through the replenishment fluid channel 361. The cleaning solution supplied through the replenishment fluid channel 361 flows to the storage tank 370 through the collection fluid channel 360.

In some cases, the cleaning solution may be replenished or supplied through the dipping storage part 320. To this end, as shown in FIG. 3, the cleaning unit 300 includes a refill auxiliary member 363 that is detachably provided on the dipping storage part 320. The refill auxiliary member 363 is formed in a funnel shape. When it is necessary to replenish the cleaning solution, the refill auxiliary member 363 is inserted into the dipping storage part 320, and the cleaning solution is poured into the dipping storage part 320 with the aid of the refill auxiliary member 363, thereby replenishing the cleaning solution. The cleaning solution supplied to the dipping storage part 320 flows to the storage tank 370 through the collection fluid channel 360. The refill auxiliary member 363 is separated from the dipping storage part 320 and stored separately in cases other than replenishing the cleaning solution.

A control unit 400 controls operations of the dispensing pump 100, the pump moving unit 200, and the cleaning unit 300.

A level sensor 381 is provided in the storage tank 370 of the cleaning unit 300. The level sensor 381 detects a level of the cleaning solution stored in the storage tank 370. When the level of the cleaning solution in the storage tank 370 drops below a predetermined level, this is detected by the level sensor 381 and transmitted to the control unit 400.

In the present embodiment, the cleaning unit 300 includes an alarm unit 390 in the form of a speaker. When a signal indicating that the amount of cleaning solution in the storage tank 370 is insufficient is monitored by the control unit 400 through the level sensor, the control unit 400 notifies a user of this by using a method such as activating the alarm unit 390 to generate an alarm sound.

The cleaning unit 300 further includes a leakage sensor 382. The leakage sensor 382 detects whether the cleaning solution leaks and transmits the detection result to the control unit 400. In the case of the present embodiment, the leakage sensor 382 is disposed below the flow rate control valve 350. Various types of sensors may be used as the leakage sensor 382. In the case of the present embodiment, a sensor that optically detects the leakage of the cleaning solution to determine whether there is a leakage is used. When a signal indicating the leakage of the cleaning solution is generated by the leakage sensor 382 and transmitted to the control unit 400, the control unit 400 operates the alarm unit

390 to generate an alarm sound. In such a manner, the control unit 400 notifies the user of the leakage of the cleaning solution.

Meanwhile, the control unit 400 operates the supply pump 330 of the cleaning unit 300 in various ways. As described above, when the control unit 400 operates the supply pump 330 in the form of a membrane pump at a relatively high frequency, the cleaning solution flows in the dipping part 310 at a constant flow rate. If necessary, the control unit 400 may operate the supply pump 330 such that the cleaning solution flows in pulses in a regular cycle in the dipping part 310. For example, when the nozzle 110 of the dispensing pump 100 is disposed in the dipping part 310 by the pump moving unit 200, the control unit 400 may control such that the cleaning solution pulses in the dipping part 310. That is, the control unit 400 may control the operation of the supply pump 330 in a manner that increases and decreases the flow rate of the cleaning solution ejected from the dipping part 310 at a predetermined period.

When the control unit 400 operates the supply pump 330 in such a manner, it is possible to more effectively achieve a cleaning function or a viscous solution hardening prevention function of the nozzle 110.

Hereinafter, an operation of the dispensing apparatus capable of cleaning a nozzle of the present embodiment configured as described above will be described.

First, a cleaning solution is filled in the storage tank 370 of the cleaning unit 300. The cleaning solution may be filled in the storage tank 370 in two ways. First, the cleaning solution may be supplied to the storage tank 370 using the replenishment fluid channel 361. When a cleaning solution supply pipe is connected to the replenishment fluid channel 361, and the cleaning solution is supplied, the cleaning solution flows into the storage tank 370 and is filled in the storage tank 370. In an embodiment, the cleaning solution may be supplied by opening the replenishment fluid channel 361. In an embodiment, the cleaning solution may be supplied such that the cleaning solution supply pipe is configured to be connected to the replenishment fluid channel 361 and a valve is open or closed. Second, as shown in FIG. 3, the cleaning solution may also be supplied using the refill auxiliary member 363. When the refill auxiliary member 363 is mounted on the dipping storage part 320 and the cleaning solution is poured, the cleaning solution is stored in the storage tank 370 while flowing along the collection fluid channel 360. The control unit 400 may determine whether the cleaning solution is sufficiently filled in the storage tank 370 through the level sensor 381.

When the cleaning solution is sufficiently filled in the storage tank 370, the control unit 400 operates the supply pump 330 of the cleaning unit 300. When the supply pump 330 operates, the cleaning solution in the storage tank 370 is transferred to the dipping part 310 through the supply fluid channel 340 and is ejected. A user operates the control part 351 of the flow rate control valve 350 provided in the supply fluid channel 340 to finely control a flow rate of the cleaning solution ejected from the dipping part 310. When the user tightens the control part 351 formed in the form of a bolt, the flow rate of the cleaning solution is reduced as the supply fluid channel 340 is narrowed. When the user loosens the control part 351, the flow rate of the cleaning solution is increased as the supply fluid channel 340 is widened. Depending on factors such as an ambient temperature, a viscosity of the cleaning solution, and a volume of the cleaning solution remaining in the storage tank 370, even under the same condition, the flow rate of the cleaning solution may be slightly changed, and the user may easily control the flow rate of the cleaning solution by operating the flow rate control valve 350.

The control unit 400 operates the pump moving unit 200 to move the dispensing pump 100 to the dipping part 310 at a predetermined time interval or upon completion of the dispensing operation for a predetermined number of materials 10. When the nozzle 110 of the dispensing pump 100 approaches the dipping part 310, the viscous solution on the nozzle 110 is cleaned or prevented from curing by the cleaning solution. As described above, if necessary, the control unit 400 controls the operation of the supply pump 330 such that the cleaning solution is ejected from the dipping part 310 in various patterns such as pulse waves. In addition, even when the dispensing pump is in an idle state in which no dispensing operation is being performed, the control unit 400 controls the pump moving unit 200 to move the dispensing pump 100 to the dipping part 310 so that the nozzle 110 is dipped in the cleaning solution.

As described above, the cleaning solution ejected from the dipping part 310 flows to the dipping storage part 320 and flows again to the storage tank 370 through the collection fluid channel 360. Thus, the cleaning solution is continuously used while continuously circulating between the storage tank 370 and the dipping part 310.

In the dispensing apparatus capable of cleaning a nozzle of the present embodiment, the dipping storage part 320 and the storage tank 370 provided below the dipping part 310 are separately configured, and thus, there are various advantages. Due to the characteristics of the cleaning solution, a volatile solution such as ethanol is often used as the cleaning solution, and thus, the amount of the cleaning solution decreases because the cleaning solution evaporates into the air even during use. In the dispensing apparatus capable of cleaning a nozzle of the present embodiment, since the storage tank 370 is provided separately from the dipping storage part 320, there is an advantage in that a relatively large amount of cleaning solution may be stored in the storage tank 370 and used. Accordingly, there is an advantage in that the cleaning solution may be used without being refilled for a relatively long period of time even when the cleaning solution evaporates and gradually decreases in volume. That is, there is an advantage in that the occurrence of losses due to the installation of equipment to refill the cleaning solution may be minimized. In addition, when the control unit 400 stops the operation of the supply pump 330 in a case in which the dispensing operation is not performed, the cleaning solution near the dipping part 310 flows into the storage tank 370 and stays in the storage tank 370. As a result, a space or area in which the cleaning solution is in contact with the air is reduced, thereby preventing the loss of the cleaning solution.

Meanwhile, as described above, when the level of the cleaning solution in the storage tank 370 is lower than the predetermined level, this is detected by the level sensor 381 and transmitted to the control unit 400. The control unit 400 operates the alarm unit 390 to notify the user of a lack of cleaning solution.

In addition, the leakage sensor 382 provided below the flow rate control valve 350 detects whether the cleaning solution leaks. As described above, due to the structure of the flow rate control valve 350 having the control part 351 in the form of a bolt, there is a possibility that the cleaning solution may leak in the vicinity of the flow rate control valve 350, and the leakage sensor 382 is a component to deal with such a possibility. When the cleaning solution leaks from the flow rate control valve 350 or components around the flow rate control valve 350, this is detected by the leakage sensor 382 and transmitted to the control unit 400. When the leak is detected, the control unit 400 operates the alarm unit 390 to notify the user of the leakage of the cleaning solution.

Although the present disclosure has been described and illustrated above with reference to the exemplary embodiments of the present disclosure, the scope of the present disclosure is not limited to the forms described and illustrated above.

For example, although not shown in the drawings, the dispensing apparatus capable of cleaning a nozzle may also be configured to include a separate component such as a non-woven fabric, a cleaning sheet, a brush, or the like to wipe the cleaning solution attached to the nozzle 110, which is dipped in the cleaning solution, of the dispensing pump 100.

Further, it is also possible to additionally install a vertically disposed transparent fluid channel on an outer wall of the storage tank 370 so that a remaining amount of the cleaning solution may be checked with the naked eye.

Further, in some cases, it is also possible to configure the dispensing apparatus capable of cleaning a nozzle in a structure that does not include the flow rate control valve 350.

Further, in addition to a membrane pump, it is also possible to use a pump of various other structures as the supply pump 330.

Further, it is also possible to configure the dispensing apparatus capable of cleaning a nozzle in a structure that does not include some or all of the components of the level sensor 381, the leakage sensor 382, and the alarm unit 390.

Further, the replenishment fluid channel 361 has been described above as being configured to be connected to the collection fluid channel 360, but it is also possible to configure the dispensing apparatus capable of cleaning a nozzle in a structure in which the replenishment fluid channel 361 is directly connected to the storage tank 370. It is also possible to configure the dispensing apparatus capable of cleaning a nozzle in a structure that does not include the replenishment fluid channel 361.

The dispensing apparatus capable of cleaning a nozzle according to the present disclosure can effectively supply and manage a cleaning solution while effectively cleaning the viscous solution that are likely to be attached to the nozzle.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A dispensing apparatus comprising:

a dispensing pump having a nozzle and configured to dispense a viscous solution of a liquid resin material through the nozzle;

a pump moving unit configured to move the dispensing pump;

a cleaning unit configured to clean the nozzle of the dispensing pump and including a dipping part configured to eject a cleaning solution so that the nozzle of the dispensing pump moved by the pump moving unit is immersed in the cleaning solution, a dipping storage part configured to receive and accommodate the cleaning solution that is ejected from the dipping part and flows thereinto, a storage tank in which the cleaning solution to be supplied to the dipping part is stored, a supply fluid channel connecting the storage tank and the dipping part to each other, a supply pump provided in the supply fluid channel to supply the cleaning solution stored in the storage tank to the dipping part, and a collection fluid channel connecting the dipping storage part and the storage tank to transfer the cleaning solution accommodated in the dipping storage part to the storage tank; and a control unit configured to control operations of the dispensing pump, the pump moving unit, and the cleaning unit.

2. The dispensing apparatus of claim 1, wherein the storage tank of the cleaning unit is disposed below the dipping storage part.

3. The dispensing apparatus of claim 2, wherein the cleaning unit further includes a flow rate control valve provided in the supply fluid channel to control a flow rate of the cleaning solution supplied to the dipping part.

4. The dispensing apparatus of claim 3, wherein the flow rate control valve of the cleaning unit is formed to control a fluid channel size of the supply fluid channel by manually operating a control part in the form of a bolt.

5. The dispensing apparatus of claim 4, wherein the flow rate control valve of the cleaning unit is provided in the supply fluid channel between the supply pump and the dipping part.

6. The dispensing apparatus of claim 1, wherein the cleaning unit further includes a level sensor provided in the storage tank to detect a level of the cleaning solution stored in the storage tank and transmit a detection result to the control unit.

7. The dispensing apparatus of claim 6, wherein the cleaning unit further includes an alarm unit configured to generate an alarm to notify that the level of the cleaning solution in the storage tank is lowered, and the control unit operates the alarm unit when the level sensor detects that the level of the cleaning solution is lowered.

8. The dispensing apparatus of claim 6, wherein the cleaning unit further includes a replenishment fluid channel connected to the storage tank to replenish the cleaning solution to the storage tank.

9. The dispensing apparatus of claim 6, wherein the cleaning unit further includes a refill auxiliary member formed in a funnel shape and detachably provided on the dipping storage part.

10. The dispensing apparatus of claim 1, wherein the supply pump of the cleaning unit includes a membrane pump.

11. The dispensing apparatus of claim 10, wherein, the control unit operates the supply pump of the cleaning unit such that the cleaning solution flows in pulses in the dipping part in a regular cycle, when the nozzle of the dispensing pump is disposed in the dipping part of the cleaning unit by the pump moving unit.

12. The dispensing apparatus of claim 3, wherein the cleaning unit further includes a leakage sensor disposed below the flow rate control valve to detect a leakage of the cleaning solution and transmit a leak detection signal to the control unit.

13. The dispensing apparatus of claim 12, wherein the cleaning unit further includes an alarm unit configured to generate an alarm to notify that the cleaning solution leaks, and the control unit operates the alarm unit when the leakage of the cleaning solution is detected by the leakage sensor.

* * * * *